United States Patent
Walcott et al.

(10) Patent No.: US 6,827,350 B2
(45) Date of Patent: Dec. 7, 2004

(54) HYBRID HONEYCOMB AND BRUSH SEAL FOR STEAM GLAND

(75) Inventors: Stephen Randolph Walcott, Simpsonville, SC (US); David Leach, Simpsonville, SC (US); Hamid Reza Sarshar, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/283,293

(22) Filed: Oct. 30, 2002

(65) Prior Publication Data

US 2004/0084849 A1 May 6, 2004

(51) Int. Cl.[7] .............................................. F16J 15/44
(52) U.S. Cl. ...................... 277/355; 277/409; 277/411; 277/414; 277/415
(58) Field of Search ................................ 277/345, 346, 277/347, 350, 355, 409, 411, 412, 413, 414, 415

(56) References Cited

U.S. PATENT DOCUMENTS

| | | | |
|---|---|---|---|
| 5,308,088 A | 5/1994 | Atkinson et al. | |
| 5,318,309 A | 6/1994 | Tseng et al. | |
| 5,967,746 A | * 10/1999 | Hagi et al. | 415/174.4 |
| 6,077,038 A | 6/2000 | Gail et al. | |
| 6,131,910 A | * 10/2000 | Bagepalli et al. | 277/355 |
| 6,251,494 B1 | 6/2001 | Schreiber | |
| 6,402,157 B1 | * 6/2002 | Zhou et al. | 27/355 |
| 6,464,461 B2 | * 10/2002 | Wilson et al. | 416/96 R |
| 6,499,742 B1 | * 12/2002 | Zhou et al. | 277/355 |

* cited by examiner

Primary Examiner—Alison Pickard
Assistant Examiner—Enoch Peavey
(74) Attorney, Agent, or Firm—Nixon & Vanderhye P.C.

(57) ABSTRACT

A steam gland includes a steam inlet scroll and an extraction scroll axially spaced from one another defining high and low pressure regions. A seal body is disposed between the regions and includes a pair of brush seals axially spaced from one another. Intermediate the brush seals is a honeycomb seal. The hybrid brush seal/honeycomb seal combination minimizes steam leakage between the high and low pressure regions and eliminates the possibility of heat induced damage to the rotor while optimizing seal leakage performance.

8 Claims, 4 Drawing Sheets

HYBRID HONEYCOMB AND BRUSH SEAL FOR STEAM GLAND

BACKGROUND OF THE INVENTION

The present invention relates generally to seals in a turbine for sealing between stationary and rotating components thereof and particularly relates to a hybrid brush/honeycomb seal combination for sealing between high and low pressure regions about a turbine steam gland.

Various type of seals are employed in a turbine between rotary and stationary components or between stationary components. For example, brush seals have been interposed between a stationary component and a rotary component. As well known, brush seals include a plurality of bristles disposed in a support with bristle tips projecting from the support for engagement with the rotary component. While brush seals per se are highly useful in this context, brush seals are incapable of withstanding high pressure differentials, for example, those found between high and low pressure regions on opposite sides of a steam gland in a turbine.

Labyrinth-type seals are often employed in turbines for sealing between stationary and rotary components. Because of the need to space the labyrinth teeth from the rotary component, labyrinth type seals demonstrate less than optimum leakage performance as well as the potential for heat induced damage to the rotor should the labyrinth seal teeth rub against the rotor. Honeycomb seals are also sometimes employed to seal between stationary and rotary components in turbines. While honeycomb seals typically negate the problem of heat induced damage to the rotor in comparison with labyrinth type seals, honeycomb seals provide only a marginal improvement in leakage performance when compared to labyrinth seals. Further, where substantial pressure differences exist between high and low pressure regions in the turbine, axially spaced brush seals do not function to share the pressure differential and would not meet the sealing requirements between these high and low pressure regions. Consequently, there is a need for a seal having improved leakage performance and which has the capability of sealing between high and low pressure regions with very substantial pressure differentials therebetween while at the same time minimizing the potential for heat induced damage to the rotor.

BRIEF SUMMARY OF THE INVENTION

In accordance with a preferred embodiment of the present invention, there is provided a hybrid seal for sealing between a rotary component and a stationary component including a seal body carrying arcuate first and second axially spaced brush seals about a rotary component. The seal also includes an arcuate honeycomb seal structure between the axially spaced brush seals. The honeycomb seal includes a plurality of channels extending generally radially and opening towards the rotary component. The hybrid seal including the brush seal/honeycomb combination carried by a single seal body minimizes the possibility of heat induced damage to the rotor with improved leakage performance by minimizing air and steam leakage between high and low pressure regions having a substantial pressure difference.

In a specific application of the hybrid seal hereof, the seal is formed in a steam gland in a turbine. The steam gland seals, for example, between a high pressure inlet scroll which supplies steam for transmission at high pressure to turbine buckets to cool the buckets and a low pressure steam leakage extraction scroll. The steam gland includes an outer shell defining the steam inlet and extraction scrolls, the scrolls being axially separated from one another by an elongated dovetail-shaped groove. The hybrid seal includes a generally annular seal body formed of arcuate seal segments disposed in the groove. Each segment mounts a pair of axially spaced brush seals and a honeycomb seal intermediate the brush seals. This sequential arrangement of brush seals and honeycomb seals achieves a balanced sharing of the pressure differential between the high pressure steam inlet scroll and the low pressure steam extraction scroll. A plurality of segments are provided in the dovetail groove in each of the upper and lower shells forming the turbine casing and steam gland, registering adjacent ends of the segments having a spline seal sealing between the segments. The segmented seals thus utilize intersegment spline seals to minimize end leakage.

In a preferred embodiment hereof, there is provided a seal for sealing between a rotary component and a stationary component comprising a seal body carried by the stationary component and carrying first and second arcuate brush seals. Each brush seal includes a support and a plurality of bristles carried by the support. Tips of the bristles extend beyond said support for engaging the rotary component. The brush seals are spaced axially from one another. The seal body carries an arcuate honeycomb seal extending circumferentially and axially between the first and second brush seals, the honeycomb seal including a plurality of generally radial channels opening toward the rotary component whereby the brush and honeycomb seals seal between axially spaced high and low pressure regions on axially opposite sides of the seal.

In a further preferred embodiment hereof, there is provided a steam gland in a turbine comprising a stationary casing having a generally annular steam inlet scroll and a generally annular steam extraction scroll axially spaced from one another, a rotary component within the stationary component, a seal between the inlet scroll and the extraction scroll sealing between the stationary and rotary components and high and low pressure regions on opposite sides of the seal, a seal body carried by the stationary component and carrying first and second arcuate brush seals, each brush seal including a support and a plurality of bristles carried by the support with tips of the bristles extending beyond the support for engaging the rotary component, the brush seals being spaced axially from one another, the seal body including an arcuate honeycomb seal extending axially between the first and second brush seals, the honeycomb seal including a plurality of generally radial channels opening toward the rotary component whereby said brush and honeycomb seals seal between axially spaced high and low pressure regions on axially opposite sides of the seal.

Figure 1:
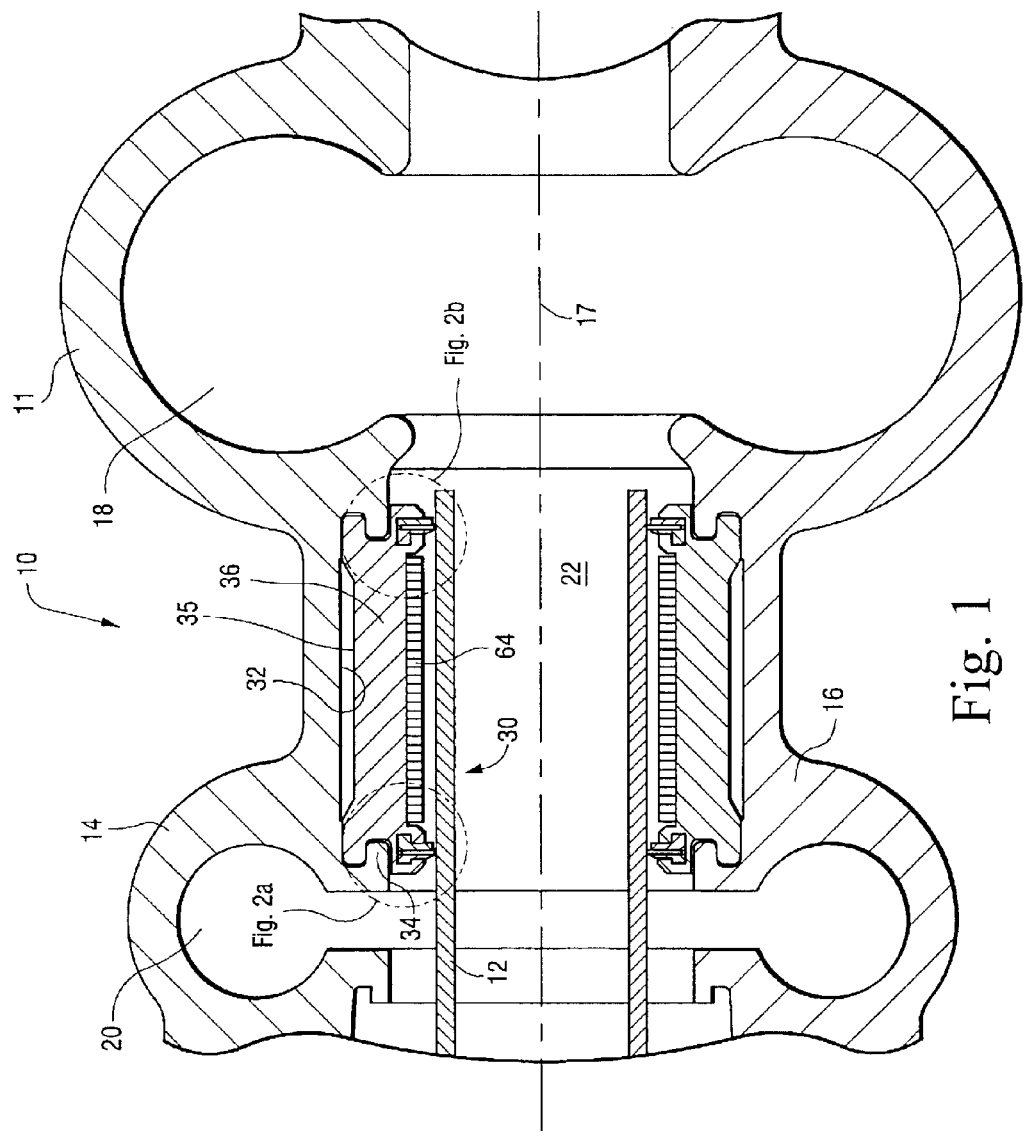
FIG. 1 is a fragmentary cross-sectional view illustrating a steam gland for use in a turbine.

Referring to the drawings, particularly to FIG. 1, there is illustrated a portion of a steam gland, generally designated 10, disposed about a bore tube 12. Steam gland 10 includes an annular stationary casing 11 having outer, upper and lower shells 14 and 16, respectively, joined one to the other along a horizontal midline joint 17. The steam gland 10 also includes a steam inlet scroll 18 (a high pressure region) and an extraction scroll 20 (a low pressure region) forming annular passages about the steam gland 10. It will be appreciated that the steam gland 10 is fixed and the bore tube 12 rotates about the rotor shaft axis. A steam plenum connected to a supply of steam from a suitable source, not shown, lies in communication with the inlet scroll 18 for supplying cooling steam to the interior passage 22 within the tube 12 of the bore tube assembly. The extraction scroll 20 is connected to a steam return, not shown, for receiving steam leakage passing the hybrid seal, generally designated 30, and constructed according to a preferred embodiment of the present invention. Thus, any steam leakage from the inlet scroll 18 past the hybrid seal 30 does not flow further forwardly to the aft main bearing of the turbine, not shown. Rather, steam leakage is collected by the extraction scroll 20 for reuse. For further details of the environment in which the steam gland 10 is utilized reference is made to U.S. patent application Ser. No. 09/566,085 filed May 9, 2000 of common assignee herewith, the disclosure of which is incorporated herein by reference.

Figure 2B:
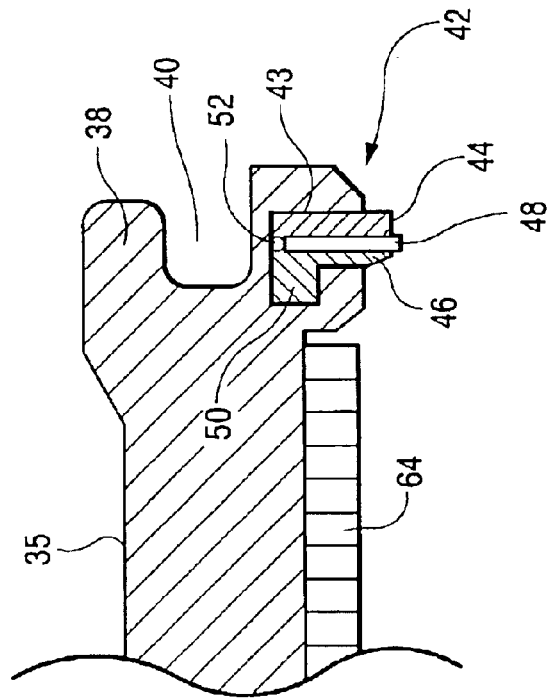
FIG. 2b is a view similar to FIG. 2a illustrating an opposite side of the seal segment.
Figure 2A:
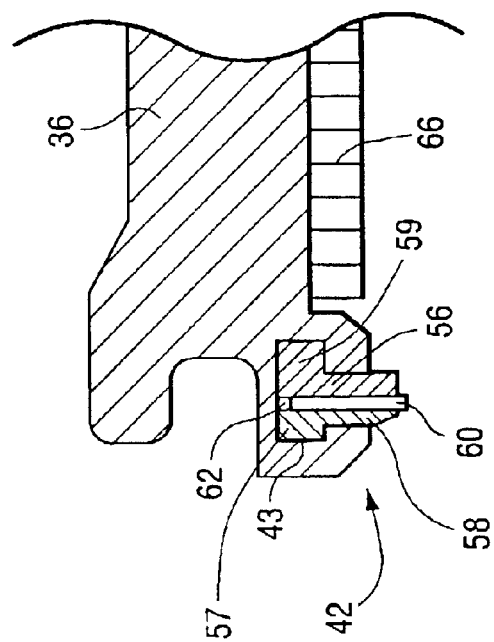
FIG. 2a is an enlarged fragmentary cross-sectional view of one side of a seal segment in the steam gland.
Figure 3:
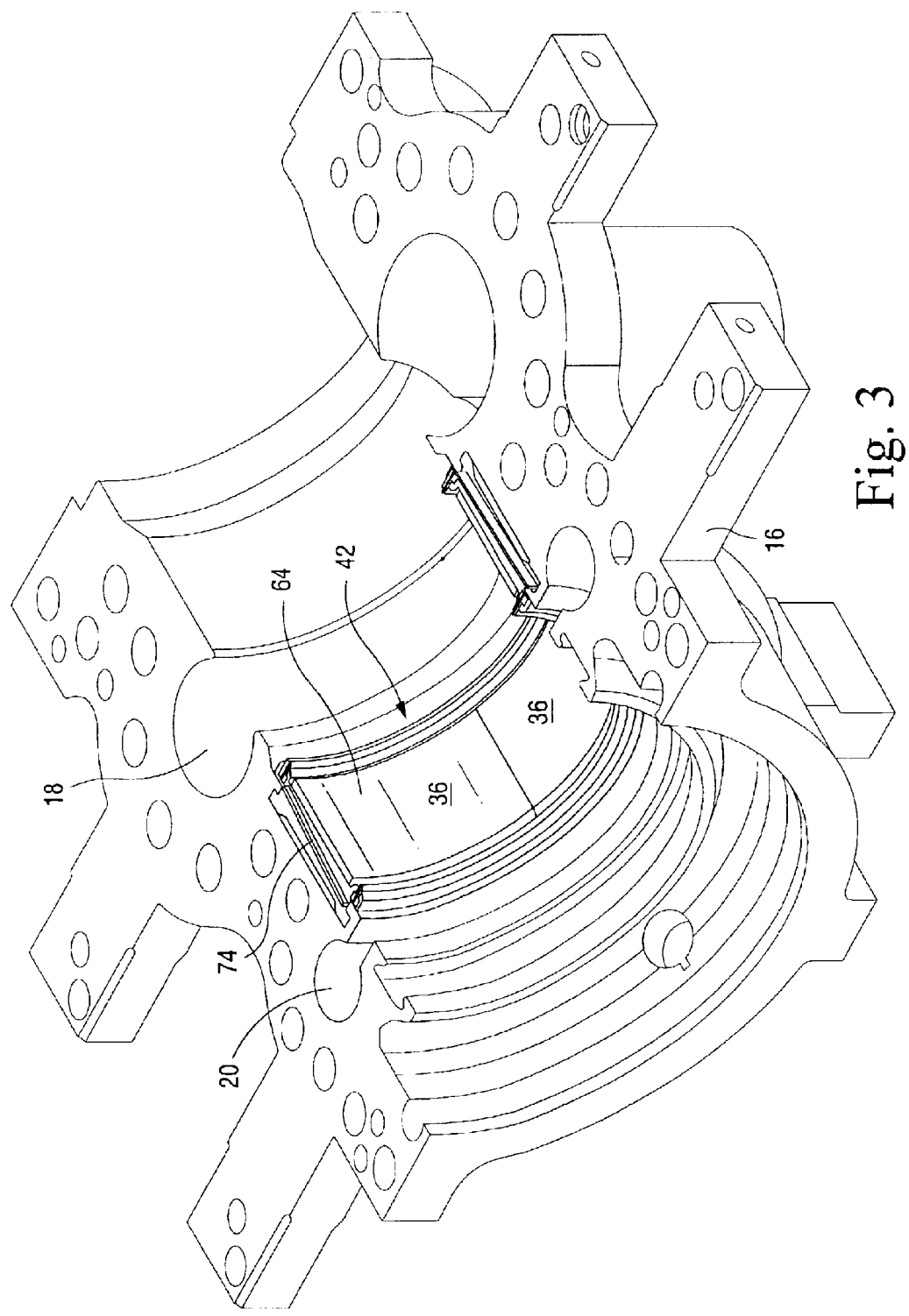
FIG. 3 is a perspective view illustrating the lower turbine casing with the hybrid brush seal/honeycomb seal in the lower casing half.
Figure 4:
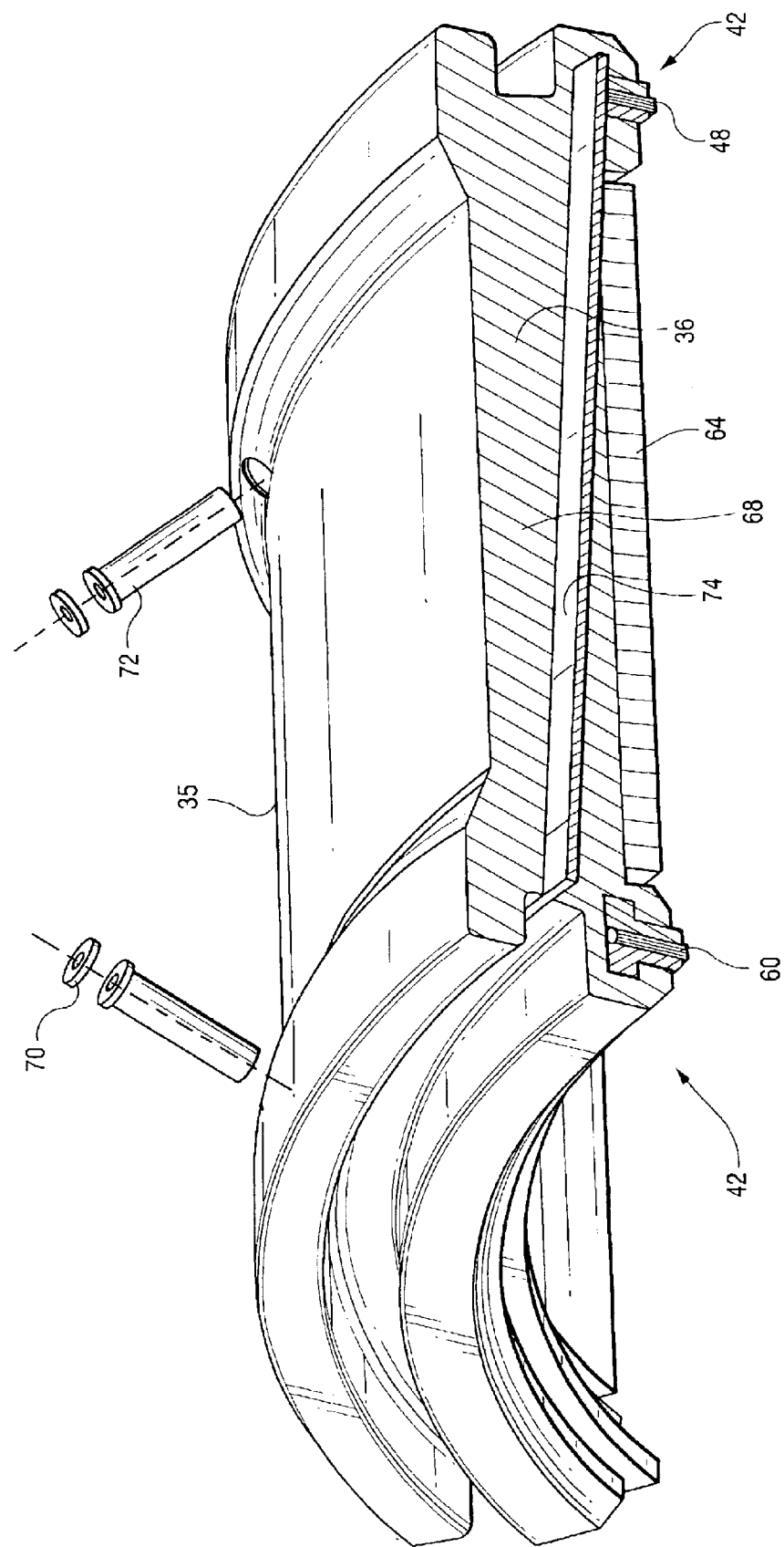
FIG. 4 is an enlarged perspective view of a seal segment incorporating the hybrid seal hereof.

In accordance with a preferred embodiment hereof, the steam gland 10 includes a generally dovetail-shaped internal groove 32 which extends annularly about the tube 12 for receiving the hybrid seal 30, the dovetail groove 32 having axially opposed flanges 34. Referring to FIGS. 2a and 2b, a seal body 35 is disposed in the annular groove 30 of the steam gland 10. The seal body 35 includes an annular ring which may be formed in 180 degree segments for disposition in the upper and lower turbine shells, respectively, or may be provided in arcuate circumferentially extending segments 36 in each of the upper and lower turbine shells. Plural arcuate seal segments 36 are illustrated in FIGS. 3 and 4. Each seal segment 36 has an axial extent terminating in arcuately extending flanges 38 (FIG. 2b) adjacent axially opposite ends and recesses 40, likewise adjacent axially opposite ends. Each segment 36 is thus received within the groove 32 with the flanges 34 of the groove 32 received in the recesses 40 of the seal body 36 retaining the seal body 36 in the stationary component, e.g. the steam gland.

Brush seals, generally designated 42, are provided adjacent opposite ends, i.e., axially spaced ends of the annular seal and particularly adjacent opposite ends of each seal segment. The brush seals 40 are each formed of a support 43 including a pair of backing plates. For example, the brush seal 42 adjacent the upstream high pressure region of the steam inlet scroll 18 includes backing plates 44 and 46 on opposite sides of brush bristles 48. The backing plate 46 includes an axially directed flange 50 received in a recess of a complementary-shaped slot formed along the arcuate inner surface of the seal body 36. The backing plates 44 and 46 straddle bristles 48 disposed between the backing plates, the bristles and backing plates being welded to one another by a weld bead 52. Consequently it will be appreciated that a generally L-shaped brush seal extends arcuately and continuously along the upstream side of each seal body segment 36.

On the downstream side of seal body 36 adjacent the low pressure region and the extraction scroll 20, the brush seal 42 similarly includes a pair of backing plates 56 and 58 on opposite sides of the bristles 60. In this configuration, however, each of the backing plates 56 and 58 has axially oppositely extending flanges 57 and 59, respectively, for reception in recesses in a correspondingly-shaped groove formed along the inner surface of the seal body 36. The bristles and backing plates are secured to one another by a weld bead 62. With this arrangement it will be appreciated that the tips of the bristles 48 and 60 of the respective brush seals 42 engage the tube 12 at axially spaced locations therealong.

Intermediate the brush seals 44 and 54 on each seal segment 36, there is provided a honeycomb seal 64. Honeycomb seal 64 lies circumferentially coextensive with its corresponding seal segment 36 and spans in an axial direction the majority of the length of seal segment 36 between the brush seals and circumferentially between spaced ends of the segment. The honeycomb seal may be formed of metal or a ceramic and may be formed of radially inwardly opening channels having a hexagonal configuration and cross section. The brush seals 44 and 54 are maintained in the respective grooves by C-clips and anti-rotation pins 72 (FIG. 4).

It will be appreciated that where the seal body 35 comprises a plurality of circumferentially extending seal segments 36, there is a potential for a leakage path between adjoining end faces 68 of the seal segments 36. Referring to FIG. 4, the end faces 68 of the seal segments are provided with a spline seal 74. Spline seal 74 comprises a flat generally rectilinear sheet metal element disposed in circumferentially registering grooves of the registering end faces of the adjacent seal segments.

It will be appreciated that the hybrid brush seal/honeycomb seal hereof may withstand a high pressure differential between the high and low pressure regions of the inlet scroll and extraction scroll. Simultaneously, the hybrid seal 10 minimizes the possibility of heat-induced damage to the rotor by eliminating labyrinth-type seals. Thus steam gland performance is optimized by reducing air and steam leakage during turbine operation by using a combination brush seal/honeycomb seal in a single seal housing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A sealing system comprising:

a rotary component;

a stationary component;

a seal between said rotary component and said stationary component and between axially spaced high and low pressure regions on opposite sides of said seal for minimizing fluid flow from the high pressure region across said seal to the low pressure region;

said seal including a seal body carried by said stationary component between said high and low pressure regions, said seal body carrying first and second arcuate brush seals, each brush seal including a support and a plurality of bristles carried by said support with tips of said bristles extending beyond said support for engaging the rotary component, each said support including a backing plate on the downstream side of the bristles;

said brush seals being spaced axially from one another;

said seal body carrying an arcuate honeycomb seal extending axially between said first and second brush seals, said honeycomb seal including a plurality of generally radial channels opening toward said rotary component whereby said brush and honeycomb seals seal between the stationary and rotary components to minimize fluid flow from the high pressure region to the low pressure region;

at least one of said backing plates including an axially extending flange.

2. A sealing system comprising:

a rotary component;

a stationary component;

a seal between said rotary component and said stationary component and between axially spaced high and low pressure regions on opposite sides of said seal for minimizing fluid flow from the high pressure region across said seal to the low pressure region;

said seal including a seal body carried by said stationary component between said high and low pressure regions, said seal body carrying first and second arcuate brush seals, each brush seal including a support and a plurality of bristles carried by said support with tips of said bristles extending beyond said support for engaging the rotary component, each said support including a backing plate on the downstream side of the bristles;

said brush seals being spaced axially from one another;

said seal body carrying an arcuate honeycomb seal extending axially between said first and second brush seals, said honeycomb seal including a plurality of generally radial channels opening toward said rotary component whereby said brush and honeycomb seals seal between the stationary and rotary components to minimize fluid flow from the high pressure region to the low pressure region;

said support for each brush seal comprising a backing plate on an upstream side of said bristles, at least one of said first and second brush seals including an axially extending flange on each backing plate thereof.

3. A sealing system comprising:

a rotary component;

a stationary component;

a seal between said rotary component and said stationary component and between axially spaced high and low pressure regions on opposite sides of said seal for minimizing fluid flow from the high pressure region across said seal to the low pressure region;

said seal including a seal body carried by said stationary component between said high and low pressure regions, said seal body carrying first and second arcuate brush seals, each brush seal including a support and a plurality of bristles carried by said support with tips of said bristles extending beyond said support for engaging the rotary component, each said support including a backing plate on the downstream side of the bristles;

said brush seals being spaced axially from one another;

said seal body carrying an arcuate honeycomb seal extending axially between said first and second brush seals, said honeycomb seal including a plurality of generally radial channels opening toward said rotary component whereby said brush and honeycomb seals seal between the stationary and rotary components to minimize fluid flow from the high pressure region to the low pressure region;

said seal body including a pair of axially extending flanges along opposite sides thereof.

4. A seal according to claim 1 wherein said seal body includes a plurality of arcuate segments, said brush seals and said arcuate segments being generally coextensive with one another about the rotary component.

5. A steam gland in a turbine comprising:

a stationary casing having a generally annular steam inlet scroll defining a high pressure region and a generally annular steam extraction scroll defining a low pressure region, said scrolls being axially spaced from one another;

a rotary component within said stationary component, a seal between said inlet scroll and said extraction scroll sealing between said stationary and rotary components and between said high and low pressure regions on opposite sides of said seal to minimize fluid flow from said high pressure region across said seal to said low pressure region;

a seal body carried by the stationary component and carrying first and second arcuate brush seals, each brush seal including a support and a plurality of bristles carried by said support with tips of said bristles extending beyond said support for engaging the rotary component;

said brush seals being spaced axially from one another;

said seal body including an arcuate honeycomb seal extending axially between said first and second brush seals, said honeycomb seal including a plurality of generally radial channels opening toward said rotary component whereby said brush and honeycomb minimize fluid flow between the axially spaced high and low pressure regions along opposite sides of seal;

said stationary casing having an arcuate dovetail-shaped groove including a pair of axially extending flanges, said seal body including a pair of axially extending flanges along opposite sides thereof and received in said dovetail-shaped groove.

6. A steam gland according to claim 5 wherein said support for each brush seal comprises a pair of plates on opposite sides of said bristles.

7. A steam gland according to claim 5 wherein said seal body comprises at least a pair of arcuate segments extending in a circumferential direction, said segments having circumferentially registering end faces with a spline seal between said registering ends.

8. A steam gland according to claim 5 wherein said stationary component comprises upper and lower shells of a turbine casing secured together along a midline joint, said seal body comprising a plurality of arcuate segments extending in a circumferential direction in each of said upper and lower shells, adjacent end faces of said segments in each of said upper and lower shells having circumferentially extending spline seals for sealing between the segments.

* * * * *

UNITED STATES PATENT AND TRADEMARK OFFICE
CERTIFICATE OF CORRECTION

PATENT NO. : 6,827,350 B2
DATED : December 7, 2004
INVENTOR(S) : Walcott, Stephen et al.

It is certified that error appears in the above-identified patent and that said Letters Patent is hereby corrected as shown below:

<u>Column 6,</u>
Line 35, after the word "honeycomb" insert the word -- seals --
Line 37, delete the word "along" and insert the phrase -- on axially --

Signed and Sealed this

First Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,827,350 B2
APPLICATION NO. : 10/283293
DATED : December 7, 2004
INVENTOR(S) : Stephen Walcott et al.

It is certified that error appears in the above-identified patent and that said Letters Patent is hereby corrected as shown below:

<u>Column 6,</u>

Line 17 delete "stationary component" and insert --stationary casing--

Line 19 delete "stationary and rotary components" and insert --stationary casing and rotary component--

Line 24 delete "stationary component" and insert --stationary casing--

Line 53 delete "stationary component" and insert --stationary casing--

Signed and Sealed this

Sixteenth Day of June, 2009

JOHN DOLL
*Acting Director of the United States Patent and Trademark Office*